H. VARDEN.
DRIVING BELT.
APPLICATION FILED JAN. 7, 1918.

1,321,686.

Patented Nov. 11, 1919.

Inventor:
Helmer Varden.
by [signature]
Attorney

UNITED STATES PATENT OFFICE.

HELMER VARDEN, OF STAVANGER, NORWAY.

DRIVING-BELT.

1,321,686.  Specification of Letters Patent.  Patented Nov. 11, 1919.

Application filed January 7, 1918. Serial No. 210,701.

*To all whom it may concern:*

Be it known that I, HELMER VARDEN, citizen of Norway, residing at Nymansveien 62, Stavanger, Norway, have invented a new and useful Improvement in Driving-Belts; and I do hereby declare the following to be a full, clear, and exact description of the same.

In belting it is highly important in many cases to enable the use of a driving pulley with a small diameter and thereby to obtain the largest possible ratio of transmission. At the same time it will be advantageous to arrange the driving pulley closely adjacent to the driven pulley so as to obtain a compact construction. However, the smaller the distance is between the two pulleys and the smaller the diameter of the driving pulley is, the more difficult it will be to obtain a reliable power transmission, partly because the encircling or engaging portion of the belt decreases with decreasing pulley distance and partly because the belt must be the more flexible the smaller is the diameter of the driving pulley.

In order to overcome these difficulties I use a belt provided with a large number of holes fitting about projections upon the driving pulley, so that the transmission will take place independent of the friction between belt and pulley. Besides, the belt is made of a number of very thin steel bands connected together by rivets along the two longitudinal edges in such a manner that a small sliding may take place between the several steel bands, this being necessary in order to obtain a high flexibility of the belt.

The invention is illustrated in the accompanying drawing, in which.

Figure 1:
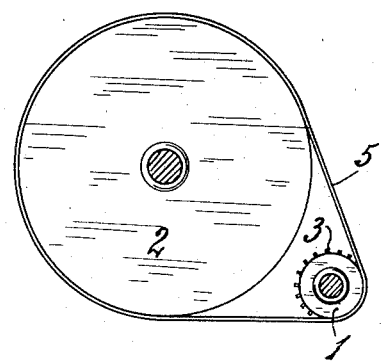
Figure 1 shows the driving pulley, the belt and the driven pulley in elevation.
Figure 2:
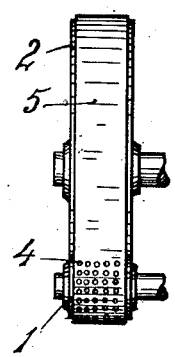
Fig. 2 is an end view of the same.
Figure 3:
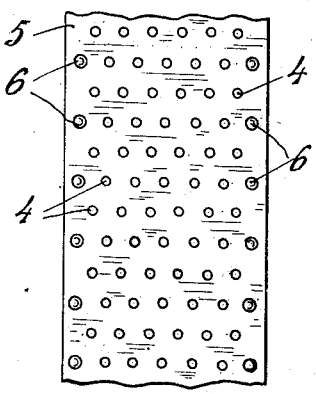
Fig. 3 shows on a larger scale a portion of a belt.

The driving pulley —1— is placed closely adjacent to the driven pulley —2— and has a small diameter. Its periphery is provided with uniformly distributed projections —3— which engage the correspondingly arranged holes —4— (Fig. 3) in the belt —5—, whereby the transmission will be independent of the friction between belt and pulley and the diameter of the latter may therefore be very small.

Figure 4:
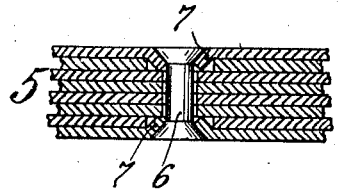
Fig. 4 shows on a larger scale a cross section of a steel band belt.

In order to obtain a belt of a sufficient flexibility and at the same time to prevent the holes —4— from being quickly worn at their edges, the belt is composed of a plurality of thin steel bands (see Fig. 4), which are placed upon each other and are held together by means of rivets —6— along the two longitudinal edges of the belt. These rivets are riveted in such a manner, however, that the steel bands are held only lightly pressed together. The two outer steel bands are provided with inclined inwardly-turned edges —7— under the rivet heads, and all the rivet holes of all bands are so spaced that in spite of the presence of the rivets a small sliding may take place between the several bands, when the belt is bent around the pulleys —1— and —2— and said bands will return to normal position after such bending.

Having now described my invention, what I claim as new and desire to secure by Letters Patent is:

A driving belt composed of thin relatively-slidable metal bands placed upon each other and each having a small relative sliding motion during bending of the belt, the bands having alined openings and the edges of the openings of the outer bands turned inwardly, and rivets passing through and smaller than said openings and with the heads of the rivets engaging the inturned edges of the outer bands.

In testimony whereof, I have signed my name to this specification in the presence of the subscribing witnesses.

HELMER VARDEN.

Witnesses:
H. M. HELMICHSEN,
MORGENS BUGGE,
JANOS JOA.